(12) United States Patent
Hanao et al.

(10) Patent No.: US 11,453,048 B2
(45) Date of Patent: Sep. 27, 2022

(54) MOLD FLUX FOR CONTINUOUS CASTING AND CONTINUOUS CASTING METHOD

(71) Applicant: NIPPON STEEL & SUMITOMO METAL CORPORATION, Tokyo (JP)

(72) Inventors: Masahito Hanao, Tokyo (JP); Daiki Naito, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 302 days.

(21) Appl. No.: 15/770,551

(22) PCT Filed: Nov. 7, 2016

(86) PCT No.: PCT/JP2016/083002
§ 371 (c)(1),
(2) Date: Apr. 24, 2018

(87) PCT Pub. No.: WO2017/078178
PCT Pub. Date: May 11, 2017

(65) Prior Publication Data
US 2019/0060985 A1     Feb. 28, 2019

(30) Foreign Application Priority Data
Nov. 5, 2015   (JP) .............................. JP2015-217238

(51) Int. Cl.
*B22D 11/111*   (2006.01)
*B22D 11/108*   (2006.01)
(Continued)

(52) U.S. Cl.
CPC ............ *B22D 11/111* (2013.01); *B22D 11/00* (2013.01); *B22D 11/108* (2013.01); *C22C 38/00* (2013.01);
(Continued)

(58) Field of Classification Search
CPC ........ C21C 7/076; C22C 38/06; B22D 11/108; B22D 11/111; B22D 11/00
(Continued)

(56) References Cited

U.S. PATENT DOCUMENTS 6,171,361 B1 *  1/2001  Fu ...................... B22D 11/111
                                                             75/300
8,146,649 B2 *  4/2012  Miyake ................ B22D 11/16
                                                             164/468

FOREIGN PATENT DOCUMENTS

CN    1233488 C   * 12/2005
CN    1974062 A     6/2007
(Continued)

OTHER PUBLICATIONS

CN 1233488 C machine translation (Year: 2005).*
(Continued)

*Primary Examiner* — Anthony J Zimmer
*Assistant Examiner* — Jacob J Gusewelle
(74) *Attorney, Agent, or Firm* — Birch, Stewart, Kolasch & Birch, LLP

(57) ABSTRACT

A mold flux for continuous casting has a base material composition containing 25 to 60 mass % of CaO, 15 to 45 mass % of $SiO_2$, 5 to 25 mass % of F, 0.2 to 1.0 mass % of S, and 0 to 20 mass % of a total of $Li_2O$, $Na_2O$, and $K_2O$, and in the base material composition, f(1) is 0.90 to 1.90, f(2) is 0.10 to 0.40, f(3) is 0 to 0.40, and a total of CaO, $SiO_2$, F, S, $Li_2O$, $Na_2O$, and $K_2O$ is 90 to 100 mass %.

12 Claims, 1 Drawing Sheet

(51) Int. Cl.
  *B22D 11/00* (2006.01)
  *C22C 38/54* (2006.01)
  *C22C 38/00* (2006.01)
  *C22C 38/04* (2006.01)
  *C22C 38/06* (2006.01)
  *C22C 38/22* (2006.01)
  *C22C 38/26* (2006.01)
  *C22C 38/28* (2006.01)
  *C22C 38/32* (2006.01)
  *C22C 38/38* (2006.01)

(52) U.S. Cl.
  CPC ............ *C22C 38/002* (2013.01); *C22C 38/04* (2013.01); *C22C 38/06* (2013.01); *C22C 38/22* (2013.01); *C22C 38/26* (2013.01); *C22C 38/28* (2013.01); *C22C 38/32* (2013.01); *C22C 38/38* (2013.01); *C22C 38/54* (2013.01); *Y02P 10/20* (2015.11)

(58) Field of Classification Search
  USPC .......................................... 75/305, 309, 329
  See application file for complete search history.

(56) References Cited

FOREIGN PATENT DOCUMENTS

| | | | |
|---|---|---|---|
| CN | 101053893 A | 10/2007 | |
| CN | 101472691 A | 7/2009 | |
| CN | 101678442 A | 3/2010 | |
| CN | 101758174 A | 6/2010 | |
| CN | 102006950 A | 4/2011 | |
| FR | 2477574 A1 * | 9/1981 | ............... C03B 1/02 |
| JP | 59-61557 A | 4/1984 | |
| JP | 61-115653 A | 6/1986 | |
| JP | 5-84553 A | 4/1993 | |
| JP | 7-185755 A | 7/1995 | |
| JP | 8-141713 A | 6/1996 | |
| JP | 8-197214 A | 8/1996 | |
| JP | 2001-179408 A | 7/2001 | |
| JP | 2001-205402 A | 7/2001 | |
| JP | 2004-358485 A | 12/2004 | |
| JP | 2005-40835 A | 2/2005 | |
| JP | 2006-289383 A | 10/2006 | |
| JP | 2008-30061 A | 2/2008 | |
| JP | 2011-147979 A | 8/2011 | |
| JP | 2013-69913 A | 4/2013 | |
| JP | 2014-184463 A | 10/2014 | |
| JP | 2015-186813 A | 10/2015 | |

OTHER PUBLICATIONS

International Search Report for PCT/JP2016/083002 dated Dec. 13, 2016.
Morita et al., "A Study on an Oscillating-plate Viscometer for Instantaneous and Simultaneous Measurements of the Viscosity of Melts and the Noise with their Chemical Reactions", Iron and Steel, 1984, vol. 70, No. 9, pp. 1242-1249.
Watanabe et al., "Stability of Cuspidine ($3CaO \cdot 2SiO_2 \cdot CaF_2$) and Phase Relations in the $CaO-SiO_2$—$CaF_2$ System", ISIJ International, 2002, vol. 42, No. 5, pp. 489-497.
Written Opinion of the International Searching Authority for PCT/JP2016/083002 (PCT/ISA/237) dated Dec. 13, 2016.
Chinese Office Action and Search Report for counterpart Chinese Application No. 2016800634682, dated Jul. 15, 2019, with English translation.
Extended European Search Report for counterpart European Application No. 16862235.5, dated Jul. 11, 2019.
Hanao et al., "Influence of $Na_2O$ on Phase Relation between Mold Flux Composition and Cuspidine," ISIJ International, vol. 44, No. 5, 2004, pp. 827-835.
Korean Notice of Allowance For counterpart Korean Application No. 10-2018-7015126, dated Oct. 30, 2019, with English translation.

* cited by examiner

MOLD FLUX FOR CONTINUOUS CASTING AND CONTINUOUS CASTING METHOD

TECHNICAL FIELD OF THE INVENTION

The present invention relates to a mold flux for continuous casting and a continuous casting method. The mold flux and the continuous casting method are properly used to prevent cracks occurring on a slab surface in the manufacturing of slabs of Al-containing steel and Al-containing hypo-peritectic steel by continuous casting.

Priority is claimed on Japanese Patent Application No. 2015-217238, filed on Nov. 5, 2015, the content of which is incorporated herein by reference.

RELATED ART

In the manufacturing of slabs of steel by continuous casting, molten steel is solidified in a mold and a solidified shell is formed. In a case where the solidified shell has a non-uniform thickness, cracks are likely to occur on a slab surface.

Uniformizing the thickness of the solidified shell in the mold, that is, gradually cooling a front end section of the solidified shell (hereinafter, gradual cooling) is effective for preventing the cracks on the slab surface. A mold flux has been used for the gradual cooling.

The mold flux is supplied on the molten steel in the mold and melted by heat supply from the molten steel, thereby forming a molten layer on the molten steel. The molten slag which forms the molten layer flows into a gap between the mold and the solidified shell along an inner wall of the mold, and forms a film. Due to the film, the molten steel and the solidified shell coming into contact with the film are gradually cooled.

Immediately after the casting is started, the film is solidified by cooling by the mold, and a glass-like film is formed. Then, a crystal is precipitated from the glass-like film as time elapses. In a case where the crystallization of the film is promoted, the roughness of a film surface on the mold side increases. Therefore, interfacial thermal resistance increases between the mold and the film, and radiation heat transfer in the film is also suppressed. As a result, the molten steel and the solidified shell coming into contact with the film can be gradually cooled appropriately.

Hypo-peritectic steel has been known as steel in which cracks are likely to occur on a slab surface. Examples of the hypo-peritectic steel include steel containing 0.06 to 0.20 mass % of C. Hypo-peritectic steel has a high solidification shrinkage ratio when changing from a liquid phase to a solid phase. Therefore, in a case of hypo-peritectic steel, it is particularly important to gradually cool a front end section of the solidified shell. Patent Documents 1 to 7 disclose technologies for preventing or suppressing cracks on a slab surface in such hypo-peritectic steel.

For example, Patent Documents 1 to 4 disclose the following methods as a technology for promoting the above-described film crystallization.

Patent Document 1 discloses a powder for continuous casting having a viscosity of 0.6 to 2.5 poise at 1300° C. and having a solidification temperature of 1150° C. to 1250° C. In Patent Document 1, the crystallization of slag (film) is promoted by increasing the solidification temperature of the powder.

Patent document 2 discloses a powder for continuous casting containing CaO and $SiO_2$ as main components and having a basicity of 1.2 to 1.6 and a MgO content of 1.5 mass % or greater. In Patent document 2, the crystallization of slag (film) is promoted by increasing the basicity (mass ratio of CaO to $SiO_2$) of the powder and reducing the MgO content.

Patent Document 3 discloses a mold powder having such a composition that akermanite ($2CaO/MgO/2SiO_2$), gehlenite ($2CaO/Al_2O_3/SiO_2$), and melilite that is a complete solid solution thereof are precipitated as main crystal phases during the solidification. In Patent Document 3, the crystallization of slag is stabilized due to this composition.

Patent Document 4 discloses a composition range of a mold powder in a quaternary system of CaO—$SiO_2$—$CaF_2$—NaF. The composition range coincides substantially with a primary phase area of $Ca_4Si_2O_7F_2$ as shown in Non-Patent Document 1. Therefore, in the mold powder disclosed in Patent Document 4, $Ca_4Si_2O_7F_2$ is likely to precipitate. In addition, in Patent Document 4, affinity between an alkali metal and F is considered in order to adequately utilize $Ca_4Si_2O_7F_2$ (cuspidine: $3CaO/2SiO_2/CaFe_2$). As a result, in Patent Document 4, the crystallization of a film is promoted, and thus a gradual cooling effect is obtained.

Patent Document 5 discloses a composition range of a mold flux in a ternary system of CaO—$SiO_2$—$CaF_2$. In addition, in Patent Document 5, affinity between an alkali metal and F is considered in order to adequately utilize $Ca_4Si_2O_7F_2$ (cuspidine: $3CaO/2SiO_2/CaFe_2$). As a result, in Patent Document 5, the crystallization of a film is promoted, and thus a gradual cooling effect is obtained.

As described above, in Patent Document 1 to 5, the molten steel and the solidified shell coming into contact with the film are gradually cooled based on characteristics of the solid-phase film. In Patent Document 6, radiation heat transfer in the film is suppressed based on characteristics of the liquid-phase film. Patent Document 6 discloses a mold powder having a radiation heat absorption coefficient of 100 $m^{-1}$ or greater during melting. The mold powder contains greater than 10 mass % of an oxide of a transition metal so as to satisfy the absorption coefficient.

As described in Patent Document 3, S is likely to concentrate to an interface between molten slag and molten steel. Accordingly, as described in Patent Document 7, in a case where S is shifted in molten steel, the surface tension of the molten steel decreases, and the brittleness of the steel increases. Accordingly, it is important for the mold flux to have a low S concentration in order to prevent surface cracking of slabs. For example, Patent Document 7 discloses a continuous casting method using a powder in which the S concentration is equal to or lower than an upper limit value according to a casting speed. In addition, as described in Patent Document 3, in a case where the S concentration in the mold flux is low, the reduction in the interfacial tension between molten slag and molten steel due to S is reduced, and thus it is possible to prevent the molten slag (liquid part in the film) from being incorporated in the molten steel.

In recent years, there has been a demand for Al-containing steel containing 0.10 mass % or greater of Al in order to improve performance such as a product strength and corrosion resistance. However, during continuous casting of the Al-containing steel, Al in molten steel is oxidized in an interface between the molten steel and the molten slag (liquid in the film and the molten layer) generated from a mold flux, and the film composition changes. For example, in a case where a mold flux in which $Ca_4Si_2O_7F_2$ (cuspidine: $3CaO/2SiO_2/CaF_2$) is generated in a film is used, $Ca_4Si_2O_7F_2$ is diluted by $Al_2O_3$ generated, and thus the crystallization of $Ca_4Si_2O_7F_2$ is inhibited. As a result, a gradual cooling effect is not sufficiently obtained, and cracks occur on a slab surface. In addition, in a case where a temporal change in the composition of the molten layer on the molten steel in the mold is large during casting, the inflow velocity of the molten slag along an inner wall of the mold becomes non-uniform. As a result, the temperature of a copper plate of the mold largely fluctuates, and cracks are likely to occur. In addition, in order to avoid breakout, the operation is required to be performed at a low casting speed, and an average thickness of a solidified shell is required to be increased. Accordingly, in the continuous casting of Al-containing steel, the yield of slabs and the productivity are lower than in the continuous casting of other steel kinds.

However, Al-containing steel (steel containing 0.10 mass % or greater of Al) is not disclosed in the above-described Patent Documents 1 to 7. For example, the amount of Al in the steel disclosed in Patent Documents 1, 4, 5, and 7 is 0.02 to 0.04 mass % (Patent Document 1), 0.035 to 0.045 mass % (Patent Document 4), 0.02 to 0.04 mass % (Patent Document 5), and 0.03 to 0.08 mass % (Patent Document 7), respectively. Using a novel mold flux for increasing the efficiency of continuous casting of Al-containing steel has been ignored.

For example, Patent Document 1 discloses that in a case where a solidification point is increased to 1250° C. or higher, lubricity is impaired, and thus breakout cannot be prevented. As above, the upper limit of the solidification point of a mold flux is limited in a case where slabs are obtained by continuous casting from molten steel of hypoperitectic steel.

PRIOR ART DOCUMENT

Patent Document

[Patent Document 1] Japanese Unexamined Patent Application, First Publication No. H8-197214
[Patent Document 2] Japanese Unexamined Patent Application, First Publication No. H8-141713
[Patent Document 3] Japanese Unexamined Patent Application, First Publication No. 2005-40835
[Patent Document 4] Japanese Unexamined Patent Application, First Publication No. 2001-179408
[Patent Document 5] Japanese Unexamined Patent Application, First Publication No. 2004-358485
[Patent Document 6] Japanese Unexamined Patent Application, First Publication No. H7-185755
[Patent Document 7] Japanese Unexamined Patent Application, First Publication No. S61-115653

Non-Patent Document

[Non-Patent Document 1] ISIJ International, vol. 42 (2002), No. 5, pp. 489 to 497
[Non-Patent Document 2] Iron and Steel, vol. 70 (1984), No. 9, pp. 1242 to 1249

DISCLOSURE OF THE INVENTION

Problems to be Solved by the Invention

The invention is conceived in view of the above-described problems, and an object thereof is to provide a mold flux which prevents surface cracking of slabs of Al-containing steel containing 0.10 mass % or greater of Al, and a method of continuously casting Al-containing steel.

Means for Solving the Problem

The gist of the invention is as follows.

(1) A mold flux for continuous casting according to an aspect of the invention has a base material composition containing 25 to 60 mass % of CaO, 15 to 45 mass % of $SiO_2$, 5 to 25 mass % of F, 0.2 to 1.0 mass % of S, and 0 to 20 mass % of a total of $Li_2O$, $Na_2O$, and $K_2O$, and in the base material composition, $f(1)$ represented by Formula 1 is 0.90 to 1.90, $f(2)$ represented by Formula 2 is 0.10 to 0.40, $f(3)$ represented by Formula 3 is 0 to 0.40, and a total of CaO, $SiO_2$, F, S, $Li_2O$, $Na_2O$, and $K_2O$ is 90 to 100 mass %.

$$f(1)=(CaO)_h/(SiO_2)_h \quad \text{(Formula 1)}$$

$$f(2)=(CaF_2)_h/\{(CaO)_h+(SiO_2)_h+(CaF_2)_h\} \quad \text{(Formula 2)}$$

$$f(3)=(MF)_h/\{(CaO)_h+(SiO_2)_h+(MF)_h\} \quad \text{(Formula 3)}$$

$(CaO)_h$, $(SiO_2)_h$, $(CaF_2)_h$, and $(MF)_h$ in Formulae 1 to 3 are calculated as follows.

$$(CaO)_h = W_{CaO}-(CaF_2)_h \times 0.718 \quad \text{(Formula 4)}$$

$$(SiO_2)_h = W_{SiO2} \quad \text{(Formula 5)}$$

$$(CaF_2)_h=(W_F-W_{Li2O}\times1.27-W_{Na2O}\times0.613-W_{K2O}\times0.403)\times2.05 \quad \text{(Formula 6)}$$

$$(MF)_h = W_{Li2O}\times1.74+W_{Na2O}\times1.35+W_{K2O}\times1.23 \quad \text{(Formula 7)}$$

$W_i$ represents a percentage by mass of each component i.

(2) In the base material composition of the mold flux for continuous casting according to (1), the amount of S may be 0.5 to 1.0 mass %.

(3) In the base material composition of the mold flux for continuous casting according to (1), the amount of S may be 0.6 to 1.0 mass %.

(4) The base material composition of the mold flux for continuous casting according to any one of (1) to (3) may further contain 0 to 4.0 mass % of $Al_2O_3$.

(5) The base material composition of the mold flux for continuous casting according to any one of (1) to (4) may have a solidification point of 1150° C. to 1400° C.

(6) The base material composition of the mold flux for continuous casting according to any one of (1) to (4) may have a viscosity of 2 poise or less at 1300° C.

(7) The base material composition of the mold flux for continuous casting according to any one of (1) to (6) may have a basicity of 1.2 to 2.1.

(8) In the base material composition of the mold flux for continuous casting according to any one of (1) to (7), a total of CaO, $SiO_2$, F, S, $Li_2O$, $Na_2O$, and $K_2O$ may be 90 to 98 mass %.

(9) The mold flux for continuous casting according to any one of (1) to (8) may contain 0 to 10 parts by mass of C with respect to 100 parts by mass of the base material composition.

(10) A continuous casting method according to another aspect of the invention includes casting steel having a steel composition containing 0.10 to 3.00 mass % of Al using the mold flux for continuous casting according to any one of (1) to (9).

(11) In the continuous casting method according to (10), the steel composition may further contain 0.06 to 0.20 mass % of C.

(12) In the continuous casting method according to (10), the steel composition may contain 0.10 to 3.00 mass % of Al, 0 to 0.20 mass % of C, 0 to 1.0 mass % of Si, 0 to 3.0 mass % of Mn, 0 to 0.030 mass % of P, 0 to 0.010 mass % of S, 0 to 0.30 mass % of each of Cu, Ni, V, Nb, Ti, Cr, Mo, W, and Zr, 0 to 0.030 mass % of each of Ca, Mg, REM, and B, and the remainder of Fe with impurities.

(13) In the steel composition of the steel cast by the continuous casting method according to (12), the amount of C may be 0.06 to 0.20 mass %.

(14) In the steel cast by the continuous casting method according to any one of (10) to (13), the steel composition of the steel may be adjusted such that a tensile strength after hot rolling and cold rolling is 780 MPa or greater.

Effects of the Invention

According to the invention, it is possible to securely prevent surface cracking in the manufacturing of slabs of Al-containing steel by continuous casting. In addition, according to the invention, it is possible to increase the casting speed while reducing a fluctuation of the temperature of a copper plate of a mold and preventing breakout. Particularly, the invention is effective for manufacturing a slab of hypo-peritectic steel containing 0.10 mass % or greater of Al and 0.06 to 0.20 mass % of C by continuous casting in the manufacturing of a high strength steel sheet having a tensile strength of 780 MPa or greater as a completed product.

EMBODIMENTS OF THE INVENTION

Hereinafter, a mold flux according to an embodiment of the invention and a continuous casting method according to an embodiment of the invention will be shown.

In these embodiments, steel containing 0.10 mass % or greater of Al is defined as Al-containing steel. The steel may contain up to 3.00 mass % or less of Al in order to increase the strength and the corrosion resistance of the steel. $Ca_4Si_2O_7F_2$ is crystallized in a film even in a case where the steel contains 3.00 mass % of Al.

A base material of a mold flux according to this embodiment contains 25 to 60 mass % of CaO, 15 to 45 mass % of $SiO_2$, 0 to 20 mass % of $Na_2O$, $Li_2O$, and $K_2O$ (group of three kinds of alkali metal oxides) in total, 5 to 25 mass % of F, and 0.20 to 1.00 mass % of S. The mold flux according to this embodiment includes the base material, and if necessary, may include a carbon material such as a coke powder or a fine-particle carbon powder in order to adjust a melting rate. The amount of the carbon material is defined by a concentration in outer percentage relative to 100 mass % of the base material (total amount of components in the base material), and 0 to 10 mass % (10 parts by mass) with respect to 100 mass % of the base material (100 parts by mass). The mold flux according to this embodiment is defined by a composition (initial composition) before adding to a mold. In addition, the composition of the mold flux according to this embodiment is defined by a conventional method in this field as shown in Example 1 to be described later.

Figure 1:
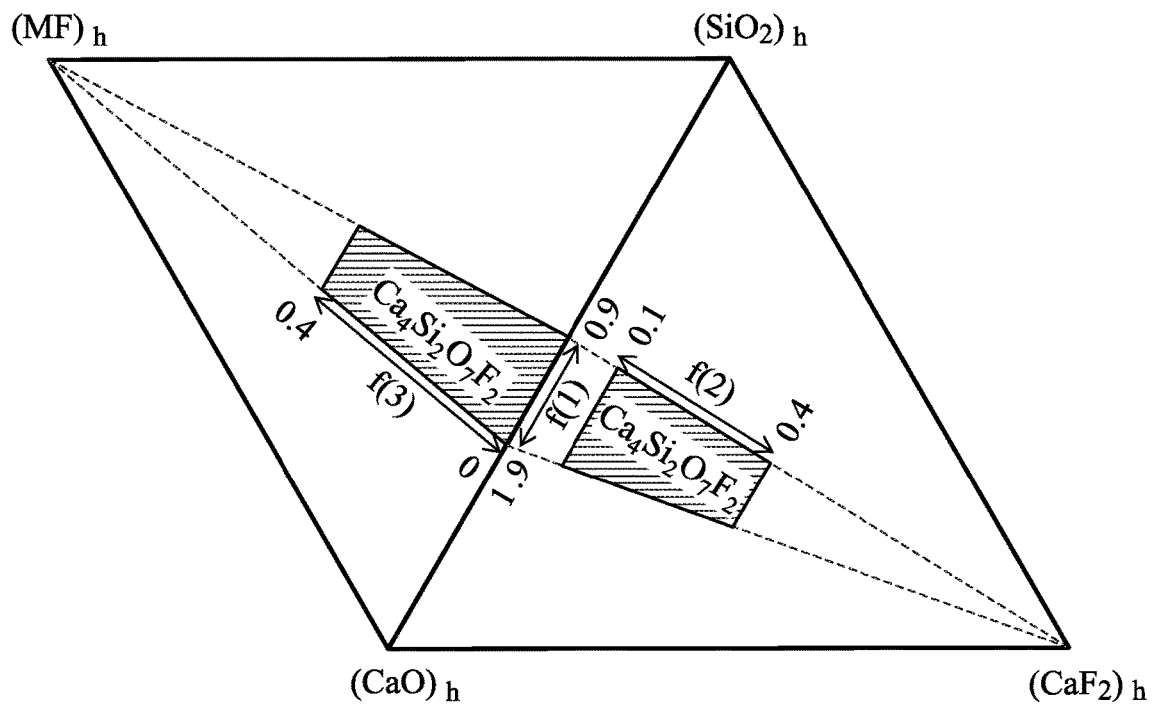
FIG. 1 is a diagram in which ranges of f(1), f(2), and f(3) in a mold flux according to an embodiment of the invention are shown in a $(CaO)_h$—$(SiO_2)_h$—$(CaF_2)_h$-$(MF)_h$ system phase diagram.

Furthermore, in the composition of the base material of the mold flux according to this embodiment, f(1) represented by Formula 1 is 0.90 to 1.90, f(2) represented by Formula 2 is 0.10 to 0.40, and f(3) represented by Formula 3 is 0 to 0.40. The ranges of f(1), f(2), and f(3) are as shown in FIG. 1, and correspond to shaded parts in $a(CaO)_h$—$(SiO_2)_h$—$(CaF_2)_h$-$(MF)_h$ quaternary system phase diagram (two ternary system phase diagrams). MF means an alkali metal fluoride.

$$f(1)=(CaO)_h/(SiO_2)_h \quad \text{(Formula 1)}$$

$$f(2)=(CaF_2)_h/\{(CaO)_h+(SiO_2)_h+(CaF_2)_h\} \quad \text{(Formula 2)}$$

$$f(3)=(MF)_h/\{(CaO)_h+(SiO_2)_h+(MF)_h\} \quad \text{(Formula 3)}$$

Here, in Formulae 1 to 3, $(CaO)_h$ is calculated by Formula 4, $(SiO_2)_h$ is calculated by Formula 5, $(CaF_2)_h$ is calculated by Formula 6, and $(MF)_h$ is calculated by Formula 7.

$$(CaO)_h=W_{CaO}-(CaF_2)_h \times 0.718 \quad \text{(Formula 4)}$$

$$(SiO_2)_h=W_{SiO2} \quad \text{(Formula 5)}$$

$$(CaF_2)_h=(W_F-W_{Li2O} \times 1.27-W_{Na2O} \times 0.613-W_{K2O} \times 0.403) \times 2.05 \quad \text{(Formula 6)}$$

$$(MF)_h=W_{Li2O} \times 1.74+W_{Na2O} \times 1.35+W_{K2O} \times 1.23 \quad \text{(Formula 7)}$$

In Formulae 4 to 7, $W_i$ represents a percentage by mass of each component i with respect to the total mass (total amount of components in the base material) of the base material. That is, $W_{CaO}$ represents a percentage by mass of CaO with respect to the total mass of the base material, $W_{SiO2}$ represents a percentage by mass of $SiO_2$ with respect to the total mass of the base material, $W_F$ represents a percentage by mass of F with respect to the total mass of the base material, $W_{Li2O}$ represents a percentage by mass of $Li_2O$ with respect to the total mass of the base material, $W_{Na2O}$ represents a percentage by mass of $Na_2O$ with respect to the total mass of the base material, and $W_{K2O}$ represents a percentage by mass of $K_2O$ with respect to the total mass of the base material. f(1), f(2), f(3), $(CaO)_h$, $(SiO_2)_h$, $(CaF_2)_h$, and $(MF)_h$ may be expressed as f1, f2, f3, $h_{CaO}$, $h_{SiO2}$, $h_{CaF2}$, and $h_{MF}$, respectively. As understood from Formulae 2 and 3 and FIG. 1, $(CaO)_h$ and $(MF)_h$ are positive values.

f(1) is different from a usual basicity defined by a mass ratio of CaO with respect to $SiO_2$. Since the mass of CaO is reduced with an increase in the mass of $CaF_2$, a numerator (mass of CaO) in the usual basicity is replaced with $(CaO)_h$ in f(1). As above, f(1) is a modified basicity, and is important for promoting the crystallization of $Ca_4Si_2O_7F_2$. Therefore, the basicity is not required to be limited. The basicity ($CaO/SiO_2$) of the base material of the mold flux according to this embodiment may be 1.2 to 2.1.

Therefore, as shown in Formula 8, the range of f(1) is 0.90 to 1.90. The range of f(1) is determined in consideration of a reduction of $SiO_2$ during continuous casting due to an oxidation-reduction reaction with Al ([Al]≥0.10 mass %) in molten steel. A preferable lower limit of f(1) is 0.95, 1.00, or 1.05. A preferable upper limit of f(1) is 1.85, 1.80, or 1.75. For example, a desirable range of f(1) is 0.95 to 1.90, 1.00 to 1.90, 1.05 to 1.90, 0.90 to 1.85, 0.95 to 1.85, 1.00 to 1.85, 1.05 to 1.85, 0.90 to 1.80, 0.95 to 1.80, 1.00 to 1.80, or 1.05 to 1.80.

$$0.90 \leq f(1) \leq 1.90 \quad \text{(Formula 8)}$$

In a case where f(1) is less than 0.90 or greater than 1.90, a required amount of a crystal phase of $Ca_4Si_2O_7F_2$ cannot be obtained, and thus the cooling in the mold becomes unstable, and the temperature of a copper plate of the mold largely fluctuates.

f(2) is a mass ratio of $(CaF_2)_h$ with respect to the total amount of components constituting a $(CaO)_h$—$(SiO_2)_h$—$(CaF_2)_h$ system phase diagram. f(2) is also required to be adjusted within an appropriate range in order to promote the crystallization of $Ca_4Si_2O_7F_2$. Therefore, as shown in Formula 9, the range of f(2) is 0.10 to 0.40. In a case where f(2) is less than 0.10 or greater than 0.40, a sufficient amount of a crystal phase of $Ca_4Si_2O_7F_2$ cannot be obtained. A preferable lower limit of f(2) is 0.11. A preferable upper limit of f(2) is 0.35, 0.30, 0.25, or 0.20. For example, a desirable range of f(2) is 0.11 to 0.40, 0.11 to 0.35, 0.11 to 0.30, 0.11 to 0.25, 0.11 to 0.20, 0.10 to 0.35, 0.11 to 0.30, 0.11 to 0.25, or 0.11 to 0.20.

$$0.10 \leq f(2) \leq 0.40 \quad \text{(Formula 9)}$$

f(3) represents a ratio of a component acting as a solvent which dissolves $Ca_4Si_2O_7F_2$, that is, $(MF)_h$ with respect to the total amount of components constituting a $(CaO)_h$—$(SiO_2)_h$-$(MF)_h$ system phase diagram. Accordingly, f(3) is also required to be adjusted within an appropriate range in order to promote the crystallization of $Ca_4Si_2O_7F_2$. Therefore, as shown in Formula 10, the range of f(3) is 0 to 0.40. The range of f(3) is determined in consideration of a reduction of $SiO_2$ due to an oxidation-reduction reaction with Al ([Al]≥0.10 mass %) in molten steel. In a case where f(3) is greater than 0.40, a sufficient amount of a crystal phase of $Ca_4Si_2O_7F_2$ cannot be obtained. A preferable upper limit of f(3) is 0.35, 0.30, 0.25, or 0.20. For example, a desirable range of f(3) is 0 to 0.35, 0 to 0.30, 0 to 0.25, or 0 to 0.20.

$$0 \leq f(3) \leq 0.40 \quad \text{(Formula 10)}$$

As described above, the base material of the mold flux according to this embodiment is required to contain 0.20 to 1.00 mass % of S. When the amount of S is 0.20 to 1.00 mass %, a temporal change in the composition of the molten layer is small even when slabs are manufactured from molten steel of Al-containing steel by continuous casting. Therefore, the inflow velocity of the molten slag along an inner wall of the mold becomes uniform. In addition, even in a case where Al in the molten steel reacts with the molten slag in the film, and thus the film composition changes, the rate of the crystallization of $Ca_4Si_2O_7F_2$ in the film can be maintained. As a result, the thickness of a solidified shell is likely to be uniformized, and the fluctuation of the temperature of a copper plate of the mold is reduced. A preferable lower limit of the amount of S is 0.30, 0.50, 0.60, or 0.65 mass %. A preferable upper limit of the amount of S is 0.95 mass %.

Figure 2:
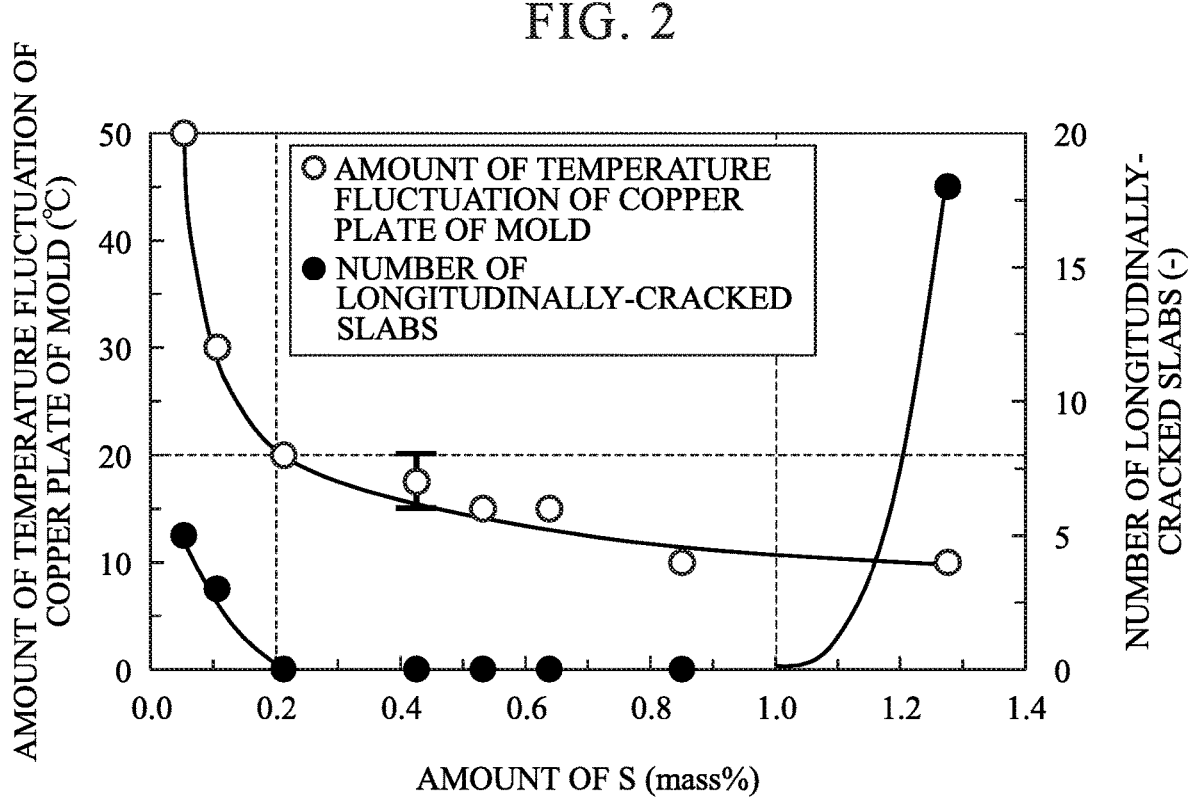
FIG. 2 is a diagram showing the relationship between the amount of S in the mold flux and the amount of temperature fluctuation of a copper plate of a mold, and the relationship between the amount of S in the mold flux and the number of longitudinally-cracked slabs.

When the amount of S is less than 0.20 mass %, the molten layer has an unstable composition, the temperature of a copper plate of the mold largely fluctuates, and cracks occur on a slab surface. When the amount of S is greater than 1.00 mass %, a negative effect of S transferred in the molten steel on the interfacial tension of the molten steel and the toughness of the steel offsets a preferable effect of S in the molten slag on the fluctuation of the temperature of a copper plate of the mold, and thus cracks occur on a slab surface. FIG. 2 shows the relationship between the amount of S (lower axis) and the number of longitudinally-cracked slabs (right axis), and the relationship between the amount of S (lower axis) and the amount of temperature fluctuation (left axis) of a copper plate of the mold. As shown in FIG. 2, it is found that surface cracking of slabs can be securely prevented, and the amount of temperature fluctuation of a copper plate of the mold can be sufficiently reduced when the amount of S is 0.20 mass % to 1.00 mass %. When the amount of temperature fluctuation of a copper plate of the mold is 20° C. or less, it is possible to prevent a solidified shell from deforming by non-uniform cooling of the solidified shell in the mold. In addition, as shown in FIG. 2, when the amount of S is greater than 0.50%, the effect of S on the reduction in the amount of temperature fluctuation of a copper plate of the mold starts to saturate. When the amount of temperature fluctuation of a copper plate of the mold is 15° C. or less, the casting speed can be substantially stably maximized. Therefore, as shown in FIG. 2, the amount of S is preferably 0.50% or greater, 0.60% or greater, greater than 0.60%, or 0.65% or greater.

In order to generate a sufficient amount of $Ca_4Si_2O_7F_2$ (cuspidine: $3CaO/2SiO_2/CaF_2$) in the film at a sufficient speed, a predetermined amount of Ca, a predetermined amount of Si, and a predetermined amount of F are required in the film. Therefore, as described above, the base material of the mold flux according to this embodiment contains 25 to 60 mass % of CaO, 15 to 45 mass % of $SiO_2$, and 5 to 25 mass % of F as essential components for generating $Ca_4Si_2O_7F_2$ (cuspidine: $3CaO/2SiO_2/CaF_2$) in the film. When the amounts of the essential components are not sufficient, a sufficient amount of a crystal phase of $Ca_4Si_2O_7F_2$ cannot be obtained in the film. A preferable lower limit of the amount of CaO is 30 or 35 mass %. A preferable upper limit of the amount of CaO is 55 or 50 mass %. A preferable lower limit of the amount of $SiO_2$ is 20 or 25 mass %. A preferable upper limit of the amount of $SiO_2$ is 40 or 35 mass %. A preferable lower limit of the amount of F is 8 or 10 mass %. A preferable upper limit of the amount of F is 20 or 15 mass %.

An alkali metal has high affinity to halogen such as F. When the mold flux contains alkali metal oxides such as $Na_2O$, $Li_2O$, and $K_2O$ in addition to CaO, $SiO_2$, and F (that is, fluorine in fluoride), alkali metal ions in the alkali metal oxides are bonded to fluorine ions in CaF2 as in Formulae 11 to 13 in the molten slag generated from the mold flux.

$$CaF_2 + Li_2O \rightarrow CaO + 2LiF \quad \text{(Formula 11)}$$

$$CaF_2 + Na_2O \rightarrow CaO + 2NaF \quad \text{(Formula 12)}$$

$$CaF_2 + K_2O \rightarrow CaO + 2KF \quad \text{(Formula 13)}$$

Therefore, $Li_2O$, $Na_2O$, and $K_2O$ in the mold flux are regarded as LiF, NaF, and KF, respectively. In addition, $CaF_2$ of which anions are exchanged with that of the alkali metal oxides is regarded as CaO. As a result, Formulae 4, 6, and 7 are obtained. Li, Na, K, Rb, Cs, and Fr are alkali metals. However, in a case where an alkali metal is added to the mold flux, one or more of Li, Na, and K is preferable as the alkali metal. $Li_2O$, $Na_2O$, and $K_2O$ are more easily available than other alkali metal oxides ($Rb_2O$, $Cs_2O$, and $Fr_2O$). Since the addition of $Rb_2O$, $Cs_2O$, and $Fr_2O$ to the mold flux is industrially very disadvantageous, these are regarded as other components to be described later.

The base material of the mold flux according to this embodiment may contain at least one selected from the group consisting of $Na_2O$, $Li_2O$, and $K_2O$ as an optional component for adjusting a solidification point. However, in a case where the amount of the alkali metal oxides is too large, the amount of the above-described essential components is not sufficient. Therefore, when the total amount of the alkali metal oxides is greater than 20 mass %, a sufficient amount of a crystal phase of $Ca_4Si_2O_7F_2$ cannot be obtained. Accordingly, the total amount of $Na_2O$, $Li_2O$, and $K_2O$ is 0 to 20 mass %. A preferable upper limit of the total amount is 18, 15, 12, 10, or 8 mass %.

CaO, $SiO_2$, F, S, $Li_2O$, $Na_2O$, and $K_2O$ are base elements of the base material of the mold flux according to this embodiment. In order to generate a sufficient amount of a crystal phase of $Ca_4Si_2O_7F_2$, the total amount of the base elements (CaO, $SiO_2$, F, S, $Li_2O$, $Na_2O$, and $K_2O$) is required to be 90 to 100 mass %. In a case where the total amount of the base elements is less than 90%, a required amount of a crystal phase of $Ca_4Si_2O_7F_2$ cannot be obtained. It is not necessary to limit the upper limit of the total amount of the base elements. In a case where the base material of the mold flux contains other components to be described later, the total amount of the base elements may be 98 mass % or less.

The base material of the mold flux according to this embodiment may contain other components other than the base elements. For example, the base material of the mold flux according to this embodiment may contain 0.1 to 10.0 mass % of $Al_2O_3$, 0.1 to 10.0 mass % of MgO, and 0.1 to 4.0 mass % of MnO. However, since the total amount of the base elements is required to be 90 mass % or greater, the total amount of other components is required to be 10 mass % or less. That is, the total amount of other components is 0 to 10 mass %. In addition, the amount of $Al_2O_3$ is 0 to 10.0 mass %, and the amount of MgO is 0 to 10.0 mass %. The amount of $Al_2O_3$ is more preferably 0 to 4.0 mass %, the amount of MgO is more preferably 0 to 4.0 mass %, and the amount of MnO is more preferably 0 to 4.0 mass %.

The solidification point of the base material of the mold flux according to this embodiment is desirably 1150° C. to 1400° C. In a case where the solidification point is within this temperature range, the crystallization of $Ca_4Si_2O_7F_2$ can be further promoted. The solidification point of the flux is measured by a rotation-type or vibration piece-type viscosity measuring device. A more preferable lower limit of the solidification point is 1200° C., 1240° C., or 1250° C. A more preferable upper limit of the solidification point is 1350° C. or 1300° C.

The viscosity of the base material of the mold flux according to this embodiment is desirably 2 poise or less (0.2 Pa·s or less) at 1300° C. 2 poise or less of viscosity is effective for gradual cooling since the crystallization rate can be further increased. The mold flux desirably has a low viscosity since the composition of the molten layer changes due to the reaction in the mold, and thus the viscosity of the molten slag during casting is higher than the viscosity of the molten slag at initial phase of casting. The viscosity of the flux is measured by a rotation-type or vibration piece-type viscosity measuring device as in the case of the solidification point. A more preferable upper limit of the viscosity of the flux is 1 poise (0.1 Pa·s).

In a continuous casting method according to an embodiment of the invention, steel (molten steel) contains 0.10 to 3.00 mass % of Al. In order to further increase the strength of completed products, the steel may contain 0.06 to 0.20 mass % of C. For example, a high strength steel sheet as a completed product preferably has a tensile strength of 780 MPa or greater. Therefore, the steel composition in the steel may be adjusted such that the tensile strength after hot rolling and cold rolling is 780 MPa or greater.

As described above, in the continuous casting method according to this embodiment, steel contains Al as an essential element. In addition, in the continuous casting method according to this embodiment, the steel may contain at least one selected from the group consisting of C, Si, Mn, P, S, Cu, Ni, V, Nb, Ti, Cr, Mo, W, Zr, Ca, Mg, REM, and B as an optional element. The remainder is Fe and impurities. For example, steel may contain 0.10 to 3.00 mass % of Al, 0 to 0.20 mass % of C, 0 to 1.0 mass % of Si, 0 to 3.0 mass % of Mn, 0 to 0.03 mass % of P, 0 to 0.01 mass % of S, 0 to 0.30 mass % of Cu, 0 to 0.30 mass % of Ni, 0 to 0.30 mass % of V, 0 to 0.30 mass % of Nb, 0 to 0.30 mass % of Ti, 0 to 0.30 mass % of Cr, 0 to 0.30 mass % of Mo, 0 to 0.30 mass % of W, 0 to 0.30 mass % of Zr, 0 to 0.030 mass % of Ca, 0 to 0.030 mass % of Mg, 0 to 0.030 mass % of REM, 0 to 0.030 mass % of B, and the remainder of Fe with impurities.

For example, the amount of Si may be 0.02 to 1.0 mass %, and the amount of Mn may be 0.5 to 3.0 mass %. In order to improve the strength and workability of a high strength steel sheet as a completed product, at least one selected from the group consisting of Cu, Ni, V, Nb, Ti, Cr, Mo, W, and Zr may be contained in an amount of 0.30 mass % or less, respectively, in steel. At least one selected from the group consisting of Ca, Mg, REM, and B may be further contained in an amount of 0.030 mass % or less, respectively, in the steel. It is not necessary to limit the lower limit of the amount of each optional element. For example, the amount of each optional element may be equal to or greater than 0%, or greater than 0%.

In the continuous casting method according to this embodiment, steel having the above-described steel composition is cast using the mold flux according to the embodiment. In the continuous casting method according to this embodiment, even if the film composition changes with an oxidation reaction caused by Al in molten steel of Al-containing steel in a mold in which molten slag is formed from the mold flux, it is possible to maintain the crystallization of $Ca_4Si_2O_7F_2$ while permitting the crystallization of $Ca_{12}Al_{14}F_2O_{32}$ in the film, and to gradually cool a front end section of a solidified shell in a comprehensive manner. In addition, in a case where the amount of C is 0.06 to 0.20 mass %, the steel may be hypo-peritectic steel, and thus surface cracking is likely to occur in slabs in conventional methods. In this case, surface cracking can be prevented using gradual cooling by the crystallization in the film.

Furthermore, during continuous casting, $SiO_2$ is reduced by Al ([Al]≥0.10 mass %) in molten steel, and the amount thereof is thus reduced. Accordingly, a mold flux in which f(1) is low may be selected according to the concentration of Al in the molten steel. In addition, the composition of the molten layer or film during the continuous casting may be measured or simulated, and the relationship between f(1) calculated from the composition of the molten layer or film and f(1) calculated from the composition of the mold flux may be determined. Based on this relationship, an appropriate mold flux can be selected. Similarly, in a case where $SiO_2$ is reduced by Al in the molten steel, f(3) calculated from the composition of the molten layer and film is increased. An increase of f(3) has an effect on the crystallization of $Ca_4Si_2O_7F_2$. Accordingly, an appropriate mold flux may be selected such that, for example, the film composition is 0.40 or less.

EXAMPLE 1

780 tons of molten steel having a composition shown in Table 1 was cast using a vertical bending-type continuous casting machine having two strands. In both of the strands, slabs having a width of 1500 mm, a thickness of 250 mm, and a length of 7000 mm were obtained. The casting speed was set to 1.5 m/min. In continuous casting, mold fluxes shown in Tables 2 to 5 were differently used for each strand.

TABLE 1

| STEEL COMPOSITION (mass %) | | | | | |
|---|---|---|---|---|---|
| C | Si | Mn | P | S | Al |
| 0.12 | 0.15 | 2.30 | 0.012 | 0.003 | 0.8 |

TABLE 2

| MOLD FLUX | COMPOSITION (mass %) | | | | | | | | | |
|---|---|---|---|---|---|---|---|---|---|---|
| | $SiO_2$ | CaO | $Al_2O_3$ | MgO | $Na_2O$ | MnO | F | S | C | |
| 1 | 32.4 | 45.4 | 2.0 | 0.9 | 6.5 | 1.2 | 11.5 | 0.21 | 6.0 | INVENTION |
| | (30.5) | (42.6) | (1.9) | (0.8) | (6.1) | (1.1) | (10.8) | (0.20) | (6.0) | EXAMPLE |
| 2 | 28.3 | 48.0 | 2.1 | 0.9 | 6.4 | 1.3 | 12.7 | 0.43 | 6.0 | INVENTION |
| | (26.6) | (45.1) | (2.0) | (0.8) | (6.0) | (1.2) | (11.9) | (0.40) | (6.0) | EXAMPLE |
| 3 | 31.9 | 44.7 | 1.9 | 0.9 | 6.2 | 1.6 | 12.2 | 0.64 | 6.0 | INVENTION |
| | (30.0) | (42.0) | (1.8) | (0.8) | (5.8) | (1.5) | (11.5) | (0.60) | (6.0) | EXAMPLE |
| 4 | 28.3 | 48.0 | 2.2 | 0.9 | 5.3 | 1.6 | 12.9 | 0.85 | 6.0 | INVENTION |
| | (26.6) | (45.2) | (2.1) | (0.8) | (5.0) | (1.5) | (12.1) | (0.80) | (6.0) | EXAMPLE |
| 5 | 35.6 | 42.8 | 2.3 | 0.9 | 4.8 | 1.4 | 11.7 | 0.53 | 6.0 | INVENTION |
| | (33.5) | (40.2) | (2.2) | (0.8) | (4.5) | (1.3) | (11.0) | (0.50) | (6.0) | EXAMPLE |
| 6 | 24.1 | 50.5 | 4.2 | 0.9 | 6.9 | 0.5 | 12.5 | 0.43 | 6.0 | INVENTION |
| | (22.6) | (47.5) | (3.9) | (0.8) | (6.5) | (0.5) | (11.7) | (0.40) | (6.0) | EXAMPLE |
| 7 | 24.1 | 50.5 | 4.2 | 0.9 | 6.9 | 0.5 | 12.5 | 0.53 | 6.0 | INVENTION |
| | (22.6) | (47.5) | (3.9) | (0.8) | (6.5) | (0.5) | (11.7) | (0.50) | (6.0) | EXAMPLE |

TABLE 3

| MOLD FLUX | COMPOSITION (mass %) | | | | | | | | | |
|---|---|---|---|---|---|---|---|---|---|---|
| | $SiO_2$ | CaO | $Al_2O_3$ | MgO | $Na_2O$ | MnO | F | S | C | |
| 8 | 32.2 | 45.1 | 2.0 | 0.9 | 6.4 | 1.5 | 11.9 | <u>0.11</u> | 6.0 | COMPARATIVE |
| | (30.3) | (42.4) | (1.9) | (0.8) | (6.0) | (1.4) | (11.2) | (0.10) | (6.0) | EXAMPLE |
| 9 | 28.7 | 48.8 | 2.3 | 0.9 | 5.9 | 1.4 | 12.0 | <u>0.05</u> | 6.0 | COMPARATIVE |
| | (27.0) | (45.9) | (2.2) | (0.8) | (5.5) | (1.3) | (11.3) | (0.05) | (6.0) | EXAMPLE |
| 10 | 28.2 | 47.9 | 2.0 | 0.9 | 6.5 | 1.2 | 12.1 | <u>1.28</u> | 6.0 | COMPARATIVE |
| | (26.5) | (45.0) | (1.9) | (0.8) | (6.1) | (1.1) | (11.4) | (1.20) | (6.0) | EXAMPLE |
| 11 | 37.4 | 37.4 | 2.7 | 0.9 | 6.9 | 2.1 | 12.2 | 0.43 | 6.0 | COMPARATIVE |
| | (35.2) | (35.2) | (2.5) | (0.8) | (6.5) | (2.0) | (11.5) | (0.40) | (6.0) | EXAMPLE |
| 12 | 23.0 | 52.8 | 1.6 | 0.9 | 7.8 | 1.0 | 12.7 | 0.43 | 6.0 | COMPARATIVE |
| | (21.6) | (49.6) | (1.5) | (0.8) | (7.3) | (0.9) | (11.9) | (0.40) | (6.0) | EXAMPLE |
| 13 | 29.5 | 50.1 | 2.6 | 0.9 | 6.9 | 1.2 | 8.5 | 0.43 | 6.0 | COMPARATIVE |
| | (27.7) | (47.1) | (2.4) | (0.8) | (6.5) | (1.1) | (8.0) | (0.40) | (6.0) | EXAMPLE |

TABLE 4

| MOLD FLUX | f(1) | f(2) | f(3) | BASICITY (—) | SOLIDIFICATION POINT (° C.) | VISCOSITY (poise) | |
|---|---|---|---|---|---|---|---|
| 1 | 1.20 | 0.11 | 0.11 | 1.40 | 1254 | 0.8 | INVENTION EXAMPLE |
| 2 | 1.40 | 0.15 | 0.11 | 1.70 | 1256 | 0.7 | INVENTION EXAMPLE |
| 3 | 1.15 | 0.14 | 0.11 | 1.40 | 1252 | 0.9 | INVENTION EXAMPLE |
| 4 | 1.34 | 0.18 | 0.10 | 1.70 | 1245 | 0.5 | INVENTION EXAMPLE |
| 5 | 0.94 | 0.16 | 0.09 | 1.20 | 1247 | 0.9 | INVENTION EXAMPLE |
| 6 | 1.80 | 0.13 | 0.12 | 2.10 | 1242 | 0.5 | INVENTION EXAMPLE |
| 7 | 1.80 | 0.13 | 0.12 | 2.10 | 1242 | 0.5 | INVENTION EXAMPLE |

TABLE 5

| MOLD FLUX | f(1) | f(2) | f(3) | BASICITY (−) | SOLIDIFICATION POINT (° C.) | VISCOSITY (poise) | |
|---|---|---|---|---|---|---|---|
| 8 | 1.18 | 0.13 | 0.11 | 1.40 | 1255 | 0.7 | COMPARATIVE EXAMPLE |
| 9 | 1.42 | 0.14 | 0.10 | 1.70 | 1249 | 0.6 | COMPARATIVE EXAMPLE |
| 10 | 1.44 | 0.13 | 0.11 | 1.70 | 1253 | 0.7 | COMPARATIVE EXAMPLE |
| 11 | 0.81 | 0.12 | 0.12 | 1.00 | 1150 | 1.2 | COMPARATIVE EXAMPLE |
| 12 | 2.03 | 0.11 | 0.13 | 2.30 | 1188 | 0.4 | COMPARATIVE EXAMPLE |
| 13 | 1.65 | 0.03 | 0.11 | 1.70 | 1176 | 0.7 | COMPARATIVE EXAMPLE |

In order to measure the composition of molten steel, the molten steel was sampled by inserting an analysis sampler into the molten steel in a mold. After solidification of the molten steel, emission spectrometric analysis was performed to find the composition of the molten steel. The obtained molten steel composition is shown in Table 1. Components other than the components shown in Table 1 were iron and impurities.

The composition of a mold flux was determined by a conventional method. That is, the amount (mass concentration) of an element, which could generally exist as a cation usually measured, was obtained by fluorescent X-ray analysis (JSX-3200 manufactured by JEOL Ltd.). The obtained amount of each element was converted into an amount of a general oxide corresponding to each element. The amount of S and the amount of C were determined by a combustion method, and the amount of F was determined by a conventional method. In the upper fields in Tables 2 and 3, the amounts of the respective components (respective oxides, F, S, and C) determined based on the total amount (total amount of the components excluding C) of a base material set to 100% are shown. The base material means components in a mold flux which form molten slag in a mold. Accordingly, C, which has little effect on the composition of the molten slag, is excluded from the base material. In the lower fields in Tables 2 and 3, the amounts of the respective components determined based on the total amount of all the components set to 100% are also shown in brackets for reference. In Tables 3 and 5, the lower lines show that the conditions according to the invention are not satisfied. In Tables 4 and 5, the basicity is $CaO/SiO_2$, and a ratio of the amount of CaO to the amount of $SiO_2$.

A mold flux melted in a graphite crucible at 1400° C. was cooled at a rate of 2° C./min, and the solidification point and the viscosity of the mold flux were measured by a vibration piece-type viscosity measuring device in the course of cooling. The viscosity was determined at 1300° C. The temperature at which the viscosity started to rapidly increase during the solidification of the melted mold flux was regarded as the solidification point. A measurement device based on the specifications disclosed in Non-Patent Document 2 was used. The obtained viscosity and solidification point are shown in Tables 4 and 5.

f(1), f(2), and f(3) shown in Tables 4 and 5 were calculated from the amounts of the components shown in Tables 2 and 3 (upper fields). The temperature of a copper plate of the mold was measured by a thermocouple thermometer. The thermocouple thermometer was positioned below a surface of the molten steel by 100 mm at a center of the width of an inner long-side surface of the mold. A temporal change in the measurement value of the thermocouple thermometer was monitored to determine an average value of the temperature of the copper plate and an amount of temperature fluctuation of the copper plate. In addition, the number of times of issuing prediction-warning of breakout was counted. Furthermore, whole surfaces of front and rear surfaces of a slab, having a width of 1500 mm and a length of 7000 mm, were visually examined. The number of cracks having a length of 10 mm or greater in a length direction of the slab was counted. A slab having 5 or more of cracks was defined as a slab having cracks, and the number of slabs having 5 or more of cracks was counted. The average temperature and the temperature range of a copper plate of the mold, the number of times of issuing prediction-warning of breakout, the average casting speed, and the number of slabs having cracks are shown in Tables 6 and 7.

TABLE 6

| | TEMPERATURE OF COPPER PLATE OF MOLD | | NUMBER OF TIMES OF ISSUING PREDICTION-WARNING OF BREAKOUT | AVERAGE CASTING SPEED (m/min) | NUMBER OF SLABS HAVING CRACKS (number) | |
|---|---|---|---|---|---|---|
| MOLD FLUX | AVERAGE VALUE | AMOUNT OF FLUCTUATION | | | | |
| 1 | 135° C. | 20° C. | 0 | 1.35 | 0 | INVENTION EXAMPLE |
| 2 | 138° C. | 15° C. | 0 | 1.33 | 0 | INVENTION EXAMPLE |
| 3 | 137° C. | 15° C. | 0 | 1.34 | 0 | INVENTION EXAMPLE |
| 4 | 141° C. | 10° C. | 0 | 1.31 | 0 | INVENTION EXAMPLE |

TABLE 6-continued

| MOLD FLUX | TEMPERATURE OF COPPER PLATE OF MOLD | | NUMBER OF TIMES OF ISSUING PREDICTION-WARNING OF BREAKOUT | AVERAGE CASTING SPEED (m/min) | NUMBER OF SLABS HAVING CRACKS (number) | |
|---|---|---|---|---|---|---|
| | AVERAGE VALUE | AMOUNT OF FLUCTUATION | | | | |
| 5 | 144° C. | 15° C. | 0 | 1.30 | 0 | INVENTION EXAMPLE |
| 6 | 136° C. | 20° C. | 0 | 1.30 | 0 | INVENTION EXAMPLE |
| 7 | 136° C. | 15° C. | 0 | 1.35 | 0 | INVENTION EXAMPLE |

TABLE 7

| MOLD FLUX | TEMPERATURE OF COPPER PLATE OF MOLD | | NUMBER OF TIMES OF ISSUING PREDICTION-WARNING OF BREAKOUT | AVERAGE CASTING SPEED (m/min) | NUMBER OF SLABS HAVING CRACKS (number) | |
|---|---|---|---|---|---|---|
| | AVERAGE VALUE | AMOUNT OF FLUCTUATION | | | | |
| 8 | 143° C. | 30° C. | 3 | 0.85 | 3 | COMPARATIVE EXAMPLE |
| 9 | 141° C. | 50° C. | 5 | 0.79 | 5 | COMPARATIVE EXAMPLE |
| 10 | 145° C. | 10° C. | 0 | 0.80 | 18 | COMPARATIVE EXAMPLE |
| 11 | 151° C. | 40° C. | 0 | 1.10 | 3 | COMPARATIVE EXAMPLE |
| 12 | 140° C. | 50° C. | 7 | 0.75 | 7 | COMPARATIVE EXAMPLE |
| 13 | 148° C. | 25° C. | 0 | 1.10 | 8 | COMPARATIVE EXAMPLE |

As shown in Table 6, in the invention examples, the amount of temperature fluctuation of a copper plate of the mold was 20° C. or lower, the prediction-warning of breakout was not issued, and the average casting speed was 1.30 m/min or more. In the invention examples, slabs having cracks were not provided.

As shown in Table 7 (comparative examples), the amount of S in the mold fluxes 8 and 9 was less than 0.20%, the amount of temperature fluctuation of a copper plate of the mold was greater than 20° C., and the cooling in the mold became unstable. Accordingly, the prediction-warning of breakout was issued, and the casting speed was necessarily reduced. As a result, the casting efficiency was reduced with the average casting speed. In addition, cracking of a slab surface also occurred with a change of the casting speed. In the mold flux 10, the amount of S was greater than 1.00%, and a large amount of S was transferred to the molten steel from the mold flux (molten slag). Thus, cracking occurred on a slab surface. In the mold fluxes 8 to 10, the average casting speed was slower than 1.0 m/min.

In addition, as shown in Table 7 (comparative examples), in the mold flux 11, f(1) was less than 0.90, and thus the amount of temperature fluctuation of a copper plate of the mold was greater than 20° C. In the mold flux 12, f(1) was greater than 1.90, and thus the amount of temperature fluctuation of a copper plate of the mold was greater than 20° C., and the cooling in the mold became unstable. Accordingly, the prediction-warning of breakout was issued, and the casting speed was necessarily reduced. As a result, the casting efficiency was reduced with the average casting speed. In the mold flux 13, f(2) was less than 0.10, and thus the amount of temperature fluctuation of a copper plate of the mold was greater than 20° C. In the mold fluxes 11 to 13, cracking occurred on a slab surface.

EXAMPLE 2

Using the mold flux 1 of Example 1, 260 tons of 9 kinds of molten steel, each having a composition shown in Table 8, was continuously cast to obtain 9 kinds of slabs.

As a continuous casting machine, a vertical bending-type continuous casting machine having two strands was used as in Example 1. In each casting, a total of 12 slabs having a width of 1500 mm, a thickness of 250 mm, and a length of 7000 mm were obtained in both the strands. The casting speed was set to 1.5 m/min.

In order to measure the composition of molten steel, the molten steel was sampled by inserting an analysis sampler into the molten steel in a mold. After solidification of the molten steel, emission spectrometric analysis was performed to obtain the composition of the molten steel. The obtained molten steel composition is shown in Table 8. Components other than the components shown in Table 8 were iron and impurities.

The results of the continuous casting are shown in Table 9. In all of the compositions, 260 tons of the molten steel was completely cast with a stable copper plate temperature of the mold and no prediction-warning of breakout. As a result, good slabs having no surface cracking and no dimples were obtained. Steel sheets were manufactured from the slabs by hot rolling and subsequent cold rolling.

A sample was collected from the steel sheets subjected to cold rolling, and a tensile strength thereof was measured by a tension tester. The measured tensile strengths are shown in Table 9. As shown in Table 9, any steel sheet has a tensile strength of 780 MPa or greater.

TABLE 8

| | STEEL COMPOSITION (mass %) | | | | | | | | | | |
|---|---|---|---|---|---|---|---|---|---|---|---|
| STEEL | C | Si | Mn | P | S | Nb | Ti | Cr | Mo | B | Al |
| A | 0.06 | 0.05 | 1.50 | 0.020 | 0.0030 | 0.02 | 0.10 | — | — | — | 0.30 |
| B | 0.06 | 0.05 | 2.00 | 0.020 | 0.0030 | 0.02 | 0.15 | — | — | — | 0.30 |
| C | 0.12 | 0.05 | 2.20 | 0.020 | 0.0030 | 0.01 | — | — | 0.06 | 0.0008 | 0.70 |
| D | 0.09 | 0.60 | 1.60 | 0.020 | 0.0030 | 0.01 | 0.13 | 0.09 | 0.10 | — | 0.20 |
| E | 0.20 | 0.80 | 2.20 | 0.020 | 0.0030 | — | 0.05 | — | — | — | 0.30 |
| F | 0.13 | 0.05 | 2.55 | 0.020 | 0.0020 | 0.01 | — | 0.30 | — | — | 0.62 |
| G | 0.14 | 0.10 | 2.50 | 0.020 | 0.0020 | 0.01 | — | 0.20 | — | 0.0015 | 0.38 |
| H | 0.15 | 0.50 | 2.45 | 0.020 | 0.0020 | — | 0.02 | 0.20 | — | 0.0010 | 0.30 |
| I | 0.13 | 0.50 | 2.80 | 0.020 | 0.0020 | 0.01 | 0.02 | 0.10 | — | 0.0015 | 0.21 |

TABLE 9

| STEEL | AMOUNT OF TEMPERATURE FLUCTUATION OF COPPER PLATE OF MOLD | NUMBER OF TIMES OF ISSUING PREDICTION-WARNING OF BREAKOUT | NUMBER OF SLABS HAVING CRACKS AND DIMPLES | TENSILE STRENGTH OF COMPLETED PRODUCT (MPa) |
|---|---|---|---|---|
| A | 20° C. or less | 0 | 0 | 810 |
| B | 20° C. or less | 0 | 0 | 870 |
| C | 20° C. or less | 0 | 0 | 980 |
| D | 20° C. or less | 0 | 0 | 1010 |
| E | 20° C. or less | 0 | 0 | 1020 |
| F | 20° C. or less | 0 | 0 | 1065 |
| G | 20° C. or less | 0 | 0 | 1190 |
| H | 20° C. or less | 0 | 0 | 1210 |
| I | 20° C. or less | 0 | 0 | 1320 |

Using the mold flux 9, molten steel of steel C was cast. The results of the continuous casting are shown in Table 11. While 260 tons of the molten steel were completely cast, the prediction-warning of breakout was issued three times, and the casting speed was necessarily reduced to 0.3 m/min. Among the 12 slabs, 6 slabs had surface cracks and were required to be subjected to scarfing repair of 3 mm. In addition, using the mold flux 9, steel D was cast. The temperature fluctuation of a copper plate of the mold was greater than 40° C., and the cooling in the mold became unstable. The prediction-warning of breakout was issued one time. Among the 12 slabs, 3 slabs had dimples or cracks on surfaces thereof, and thus scarfing repair of 3 mm was required. The steel C and the steel D in Table 10 are the same as the steel C and the steel D in Table 8.

TABLE 10

| | STEEL COMPOSITION (mass %) | | | | | | | | | | |
|---|---|---|---|---|---|---|---|---|---|---|---|
| STEEL | C | Si | Mn | P | S | Nb | Ti | Cr | Mo | B | Al |
| C | 0.12 | 0.05 | 2.20 | 0.020 | 0.0030 | 0.01 | — | — | 0.06 | 0.0008 | 0.70 |
| D | 0.09 | 0.60 | 1.60 | 0.020 | 0.0030 | 0.01 | 0.13 | 0.09 | 0.10 | — | 0.20 |

TABLE 11

| STEEL | AMOUNT OF TEMPERATURE FLUCTUATION OF COPPER PLATE OF MOLD | NUMBER OF TIMES OF ISSUING PREDICTION-WARNING OF BREAKOUT | NUMBER OF SLABS HAVING CRACKS AND DIMPLES | REMARKS |
|---|---|---|---|---|
| C | 30° C. | 3 | 6 (CRACKS) | THE CASTING SPEED WAS REDUCED TO 0.3 m/min. SCARFING REPAIR OF 3 mm WAS REQUIRED. |
| D | 40° C. | 1 | 3 (CRACKS OR DIMPLES) | SCARFING REPAIR OF 3 mm WAS REQUIRED. |

INDUSTRIAL APPLICABILITY

A mold flux for continuous casting and a continuous casting method for Al-containing steel are provided to prevent surface cracking of slabs of Al-containing steel.

The invention claimed is:

1. A mold flux for continuous casting which has a base material composition containing:
   25 to 60 mass % of CaO;
   15 to 45 mass % of $SiO_2$;
   5 to 25 mass % of F;
   0.5 to 1.00 mass % of S; and
   0 to 20 mass % of a total of $Li_2O$, $Na_2O$, and $K_2O$,
   wherein in the base material composition,
   f(1) represented by Formula 1 is 0.90 to 1.90,
   f(2) represented by Formula 2 is 0.10 to 0.40,
   f(3) represented by Formula 3 is 0 to 0.40, and
   a total of CaO, $SiO_2$, F, S, $Li_2O$, $Na_2O$, and $K_2O$ is 90 to 100 mass %, $$f(1) = (CaO)_h / (SiO_2)_h \quad \text{(Formula 1)}$$

$$f(2) = (CaF_2)_h / \{(CaO)_h + (SiO_2)_h + (CaF_2)_h\} \quad \text{(Formula 2)}$$

$$f(3) = (MF)_h / \{(CaO)_h + (SiO_2)_h + (MF)_h\} \text{tm} \quad \text{(Formula 3)}$$

where $(CaO)_h$, $(SiO_2)_h$, $(CaF_2)_h$, and $(MF)_h$ in Formulae 1 to 3 are calculated as follows, $$(CaO)_h = W_{CaO} - (CaF_2)_h \times 0.718 \quad \text{(Formula 4)}$$

$$(SiO_2)_h = W_{SiO2} \quad \text{(Formula 5)}$$

$$(CaF_2)_h = (W_F - W_{Li2O} \times 1.27 - W_{Na2O} \times 0.613 - W_{K2O} \times 0.403) \times 2.05 \quad \text{(Formula 6)}$$

$$(MF)_h = W_{Li2O} \times 1.74 + W_{Na2O} \times 1.35 + W_{K2O} \times 1.23 \quad \text{(Formula 7)}$$

where $W_i$ represents a percentage by mass of each component i.

2. The mold flux for continuous casting according to claim 1,
   wherein the amount of S is 0.6 to 1.0 mass % in the base material composition.

3. The mold flux for continuous casting according to claim 1,
   wherein the base material composition further contains 0 to 4.0 mass % of $Al_2O_3$.

4. The mold flux for continuous casting according to claim 1,
   wherein the base material composition has a solidification point of 1150° C. to 1400° C.

5. The mold flux for continuous casting according to claim 1,
   wherein the base material composition has a viscosity of 2 poise or less at 1300° C.

6. The mold flux for continuous casting according to claim 1,
   wherein the base material composition has a basicity of 1.2 to 2.1.

7. The mold flux for continuous casting according to claim 1,
   wherein a total of CaO, $SiO_2$, F, S, $Li_2O$, $Na_2O$, and $K_2O$ is 90 to 98 mass % in the base material composition.

8. The mold flux for continuous casting according to claim 1,
   wherein 0 to 10 parts by mass of C is contained with respect to 100 parts by mass of the base material composition.

9. A continuous casting method comprising:
   casting steel having a steel composition containing 0.10 to 3.00 mass % of Al,
   using the mold flux for continuous casting according to claim 1.

10. The continuous casting method according to claim 9, wherein the steel composition further contains 0.06 to 0.20 mass % of C.

11. The continuous casting method according to claim 9, wherein the steel composition contains
    0.10 to 3.00 mass % of Al,
    0 to 0.20 mass % of C,
    0 to 1.0 mass % of Si,
    0 to 3.0 mass % of Mn,
    0 to 0.030 mass % of P,
    0 to 0.010 mass % of S,
    0 to 0.30 mass % of each of Cu, Ni, V, Nb, Ti, Cr, Mo, W, and Zr,
    0 to 0.030 mass % of each of Ca, Mg, REM, and B, and the remainder of Fe with impurities.

12. The continuous casting method according to claim 11, wherein the amount of C is 0.06 to 0.20 mass % in the steel composition.

* * * * *